United States Patent [19]
Onishi et al.

[11] Patent Number: 5,645,317
[45] Date of Patent: Jul. 8, 1997

[54] CHILD SEAT APPARATUS

[75] Inventors: Ichiro Onishi; Kenzou Kassai, both of Osaka, Japan

[73] Assignee: Aprica Kassai Kabushikikaisha, Osaka, Japan

[21] Appl. No.: 583,668

[22] Filed: Jan. 5, 1996

Related U.S. Application Data

[63] Continuation of Ser. No. 266,941, Jun. 27, 1994, abandoned.

[30] Foreign Application Priority Data

Jul. 7, 1993 [JP] Japan ................................ 5-167930
Jun. 1, 1994 [JP] Japan ................................ 6-120133

[51] Int. Cl.$^6$ ................................................. A47C 1/08
[52] U.S. Cl. ................................. 297/250.1; 297/406
[58] Field of Search ............................ 297/250.1, 216.1,
297/216.11, 256.15, 256.1, 216.12, 284.1,
284.3, 284.9, 391, 406, 407, 408, 409,
404, 464, 238

[56] References Cited

U.S. PATENT DOCUMENTS

| | | | |
|---|---|---|---|
| 544,106 | 8/1895 | Mann | 297/407 |
| 4,679,855 | 7/1987 | Hattori et al. | 297/284.9 X |
| 4,790,593 | 12/1988 | Davalos et al. | 297/250.1 |
| 4,804,221 | 2/1989 | Saiki | 297/284.9 |
| 4,979,777 | 12/1990 | Takada | 297/250.1 |
| 5,002,338 | 3/1991 | Gisser | 297/464 X |
| 5,054,853 | 10/1991 | Gillies et al. | |
| 5,098,157 | 3/1992 | Surot | 297/250.1 |
| 5,098,161 | 3/1992 | Minami et al. | 297/250.1 X |
| 5,137,015 | 8/1992 | Anglehart | 297/408 X |
| 5,161,855 | 11/1992 | Harmon | 297/238 |
| 5,275,462 | 1/1994 | Pond et al. | 297/391 X |
| 5,496,092 | 3/1996 | Williams et al. | 297/250.1 |

FOREIGN PATENT DOCUMENTS

| | | |
|---|---|---|
| 0232237 | 8/1987 | European Pat. Off. . |
| 0401086 | 12/1990 | European Pat. Off. . |
| 0589071 | 3/1994 | European Pat. Off. . |
| 104550 | 10/1988 | Taiwan . |
| 192093 | 10/1993 | Taiwan . |
| 222783 | 4/1994 | Taiwan . |
| 17950 | of 1895 | United Kingdom ......... 297/407 |
| 2012568 | 8/1979 | United Kingdom ......... 297/250.1 |
| WO94/04389 | 3/1994 | WIPO . |

OTHER PUBLICATIONS

"Discussion of Machine Operation", pp. 18–19, published by Shus Foundation, Jan. 16, 1979.

*Primary Examiner*—Milton Nelson, Jr.
*Attorney, Agent, or Firm*—W. G. Fasse; W. F. Fasse

[57] ABSTRACT

A child seat apparatus such as a child safety seat for an automobile has head guards forwardly extending from both side edges of a backrest portion. The head guards are mounted on the backrest portion to be rotatable about axes extending substantially parallel to the direction of upward extension of the backrest portion or to be slideable or translatable in the width direction of the backrest portion. It is possible to reduce the spaceing distance between the pair of head guards for attaining a safe state when the child is asleep, and alternatively to increase the spacing distance between the head guards when the child is awake, to prevent the child from feeling cramped.

10 Claims, 10 Drawing Sheets

CHILD SEAT APPARATUS

This application is a CONTINUATION of application Ser. No.: 08/266,941, Filed On: Jun. 27, 1994, now abandoned.

BACKGROUND OF THE INVENTION

1. Field of the Invention

The present invention relates to a child seat apparatus, and more particularly, it relates to a child seat apparatus which comprises head guards forming walls on both sides of the head of a child seated on the seat apparatus for protecting the child's head.

2. Description of the Background Art

An exemplary child seat apparatus is a child safety seat for an automobile, which is to be mounted on an original seat of an automobile for providing a seat for safely seating a child in the automobile.

Such a child safety seat for an automobile comprises a seat portion, and a backrest portion upwardly extending from a rear end of the seat portion. The child safety seat may further comprise head guards, in order to protect the head of the child on both sides. Such head guards are generally provided to frontwardly extend from both side edges of the backrest portion.

Since the head guards are provided in consideration of safety for the child, the space or distance between the pair of head guards is preferably reduced to be capable of locating or positioning the head of the child by closely surrounding the child's head. Particularly when the child is asleep, the space between the head guards is preferably reduced in consideration of safety.

If the space or distance between the head guards is too small, however, the child disadvantageously feels cramped. When the child is awake, for example, it generally enjoys looking out the car window. In this case, the head guards unpreferably narrow the field of view of the child if the guards are in proximity to the head of the child.

In consideration of such a background, the space between the head guards is generally designed to satisfy the aforementioned inconsistent requirements. However, it is difficult to sufficiently satisfy both of these requirements.

Apparatuses providing child seats include not only the aforementioned child safety seat for an automobile, but also a baby carriage, a child chair and the like. All of such child seat apparatuses meet the aforementioned problem.

SUMMARY OF THE INVENTION

Accordingly, an object of the present invention is to provide a child seat apparatus which can satisfy both of the aforementioned inconsistent requirements.

The present invention is directed to a child seat apparatus which comprises a seat portion, a backrest portion upwardly extending from a rear end of the seat portion, and a pair of head guards forwardly extending from both side edges of the backrest portion at an upper portion of the backrest that is adapted to receive the head of the seated child, but preferably not at a lower portion of the backrest that is adapted to receive the lower back of the child. In order to solve the aforementioned technical problem, the present invention provides that a spacing distance between the head guards is changeable.

For example, the respective head guards are mounted on the backrest portion to be rotatable about axes extending substantially in parallel with the direction of upward extension of the backrest portion, so that the spacing distance between the head guards is changeable.

Further, the respective head guards may be mounted on the backrest portion to be translatable along its width.

According to the present invention, therefore, it is possible to selectively provide a narrower space for improving safety for a child and a wider space for preventing the child from feeling cramped, by changing the spacing distance between the head guards. Thus, it is possible to change the spacing distance between the head guards depending on whether the child is asleep or awake, for example. Further, it is possible to reduce the spacing distance between the head guards when the child is relatively infant for improving safety, and then to increase the space when the child gets older.

When the respective head guards are rotatably mounted on the backrest portion as described above, the child seat apparatus preferably further comprises engaging means for maintaining a plurality of positions of the head guards obtained by rotation of the respective head guards. The positions of the head guards can be stably maintained by engaging means.

When the respective head guards are rotatably mounted on the backrest portion, the child seat apparatus may further comprise a rotation operating member rotatably provided on a rear surface of the backrest portion, an angle fixing mechanism engaged with the rotation operating member for fixing a plurality of rotation angles of the rotation operating member, and a pair of rigid rods having first ends coupled to two positions of the rotation operating member between which the rotation center thereof is located and second ends coupled to the pair of head guards respectively. In this case, it is possible to symmetrically rotate the pair of head guards at the same time by rotating the rotation operating member, while it is possible to fix adjusted angles of the head guards by fixing the rotation angle of the rotation operating member by the angle fixing mechanism.

When the respective head guards are mounted on the backrest portion to be translatable along its width, the child seat apparatus may further comprise a rectilinear operating member which is rectilinearly movable along the direction of upward extension of the backrest portion, a position fixing mechanism for fixing a plurality of positions of movement of the rectilinear operating member, and a transmission mechanism for transmitting rectilinear movement of the rectilinear operating member to the pair of head guards respectively for simultaneously moving the pair of head guards in synchronism toward or away from each other. By means of this structure, the pair of head guards can be symmetrically moved at the same time upon movement of the rectilinear operating member. Further, the respective positions of the pair of head guards thus moved are fixed by the position fixing mechanism fixing the rectilinear operating member.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are perspective views showing a part of a seat included in a child seat apparatus 51 according to still another embodiment of the present invention as viewed from a front side, and in particular, FIG. 7A shows a pair of head guards 53 and 54 which in positions most separated from each other, and FIG. 7B shows the pair of head guards 53 and 54 in positions closest to each other;

FIGS. 8A and 8B are front elevational views of the seat shown in FIGS. 7A and 7B, and in particular, FIG. 8A shows the pair of head guards 53 and 54 in their positions most separated from each other, and FIG. 8B shows the pair of head guards 53 and 54 in their positions closest to each other;

FIGS. 9A and 9B are rear elevational views of the seat shown in FIGS. 7A and 7B, and in particular, FIG. 9A shows the pair of head guards 53 and 54 in their positions most separated from each other, and FIG. 9B shows the pair of head guards 53 and 54 in their positions closest to each other;

DETAILED DESCRIPTION OF THE PREFERRED EMBODIMENTS

Figure 1:
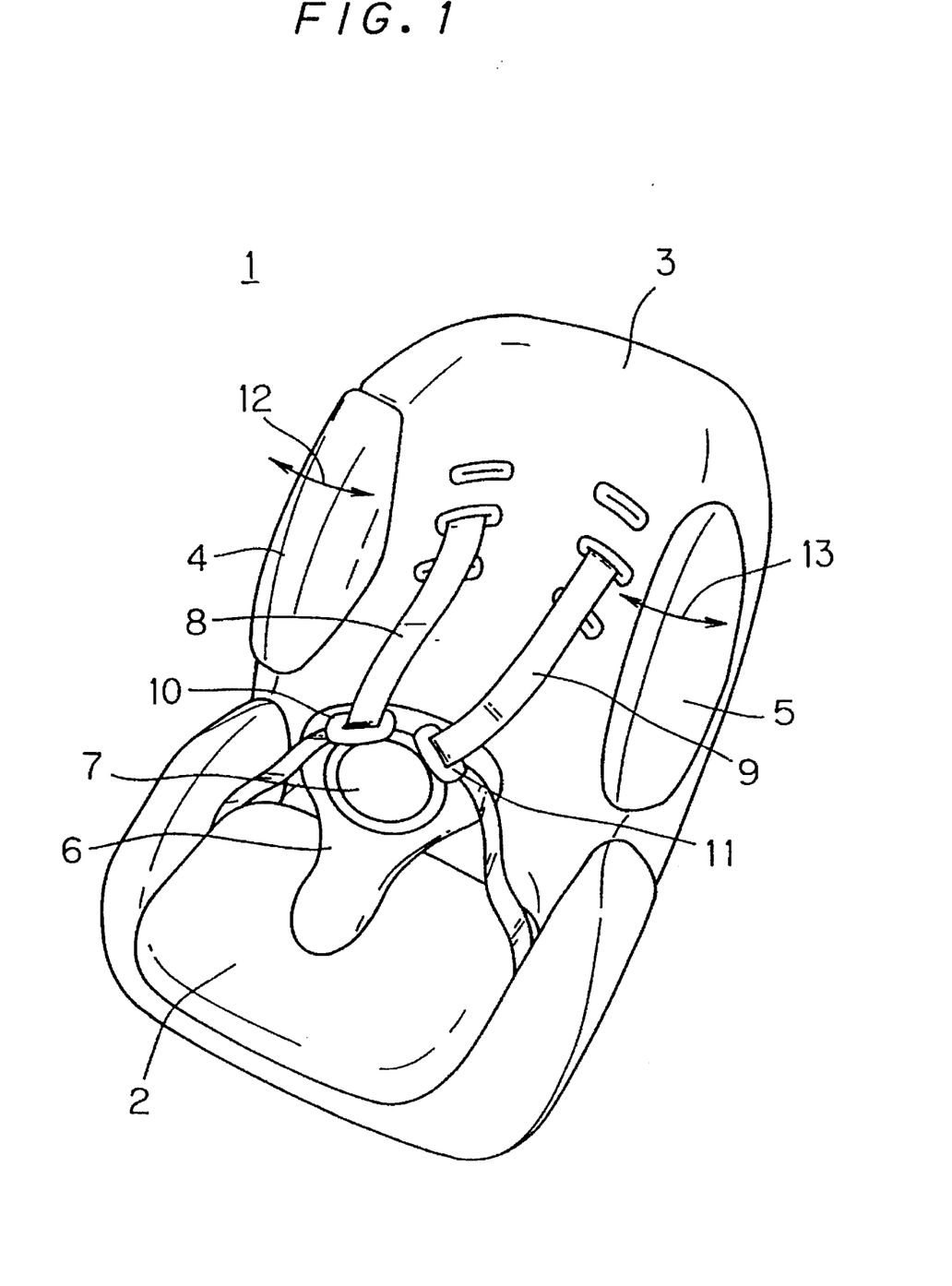
FIG. 1 is an overall perspective view showing a child safety seat 1 for an automobile according to an embodiment of the present invention.

FIG. 1 is a perspective view showing the overall appearance of a child safety seat 1 for an automobile according to an embodiment of the present invention.

The child safety seat 1 comprises a seat portion 2, a backrest portion 3 upwardly extending from a rear end of the seat portion 2, and a pair of head guards 4 and 5 forwardly extending from both side edges of the backrest portion 3 especially at an area of the backrest portion 3 located and adapted to receive the head of a child seated in the safety seat 1. The seat portion 2 is provided with an upwardly extending crotch pad 6, which is to be located between the thighs of a seated child. The crotch pad 6 holds a buckle 7. Shoulder belts 8 and 9 are drawn out from a selected pair of height-adjustment holes in the backrest portion 3 to pass over the shoulders of the child respectively. Respective ends of the shoulder belts 8 and 9 are fixed to a rear part of the seat portion 2. The 5 shoulder belts 8 and 9 are inserted in tongue plates 10 and 11 respectively. The aforementioned buckle 7 detachably couples these tongue plates 10 and 11 with each other and with the crotch pad 6. The tongue plates 10 and 11 are coupled with the buckle 7 after the child is seated on the child safety seat 1.

In such a child safety seat 1, the respective head guards 4 and 5 are rendered rotatable about axes extending substantially parallel to the direction of upward extension of the backrest portion 3. In other words, the head guards 4 and 5 are rotatable in the directions of arrows 12 and 13 in FIG. 1 respectively. The spacing distance and therewith the spacing configuration between the pair of head guards 4 and 5 is changed by such rotation. The rotatable structure of the head guards 4 and 5 will now be described in detail with reference to FIGS. 2 and 3.

Figure 2:
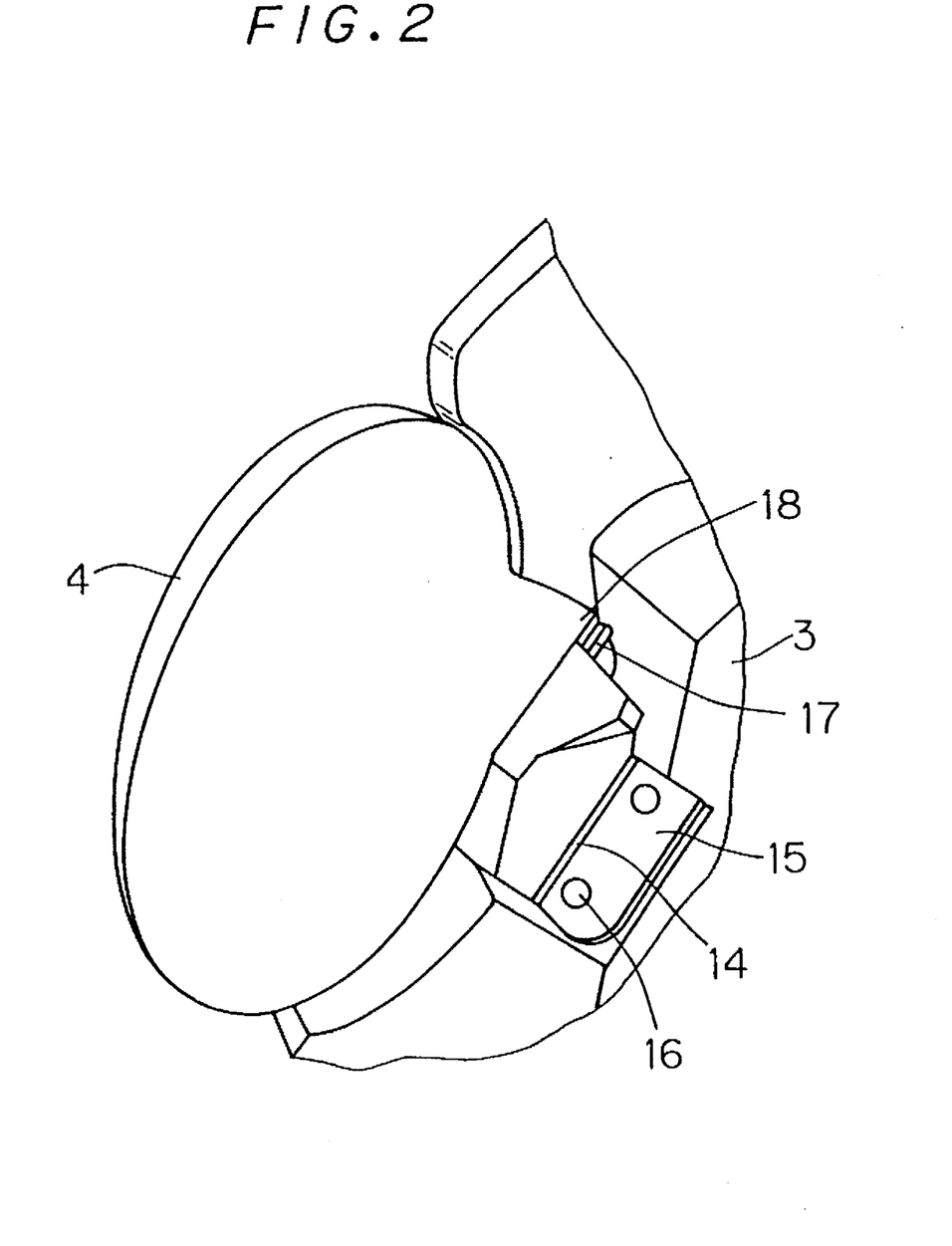
FIG. 2 is an enlarged perspective view showing a mounting portion of the head guard 4 shown in FIG. 1.
Figure 3:
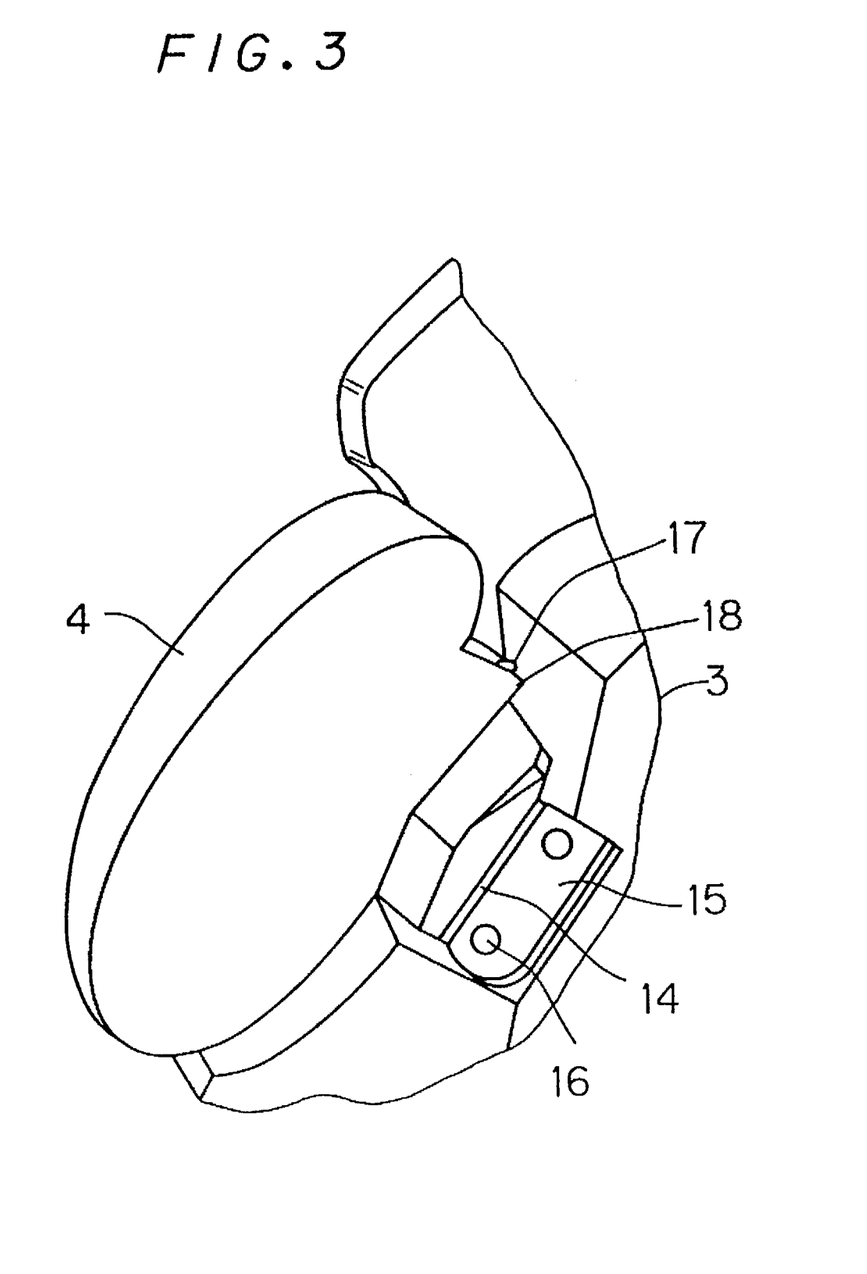
FIG. 3 is a perspective view similar to that of FIG. 2, but showing the head guard 4 rotated to reduce a spacing distance between it and another head guard 5 as compared with the state shown in FIG. 2.

FIGS. 2 and 3 are enlarged perspective views showing a mounting portion of the head guard 4. The spacing distance between the pair of head guards 4 and 5 is increased and decreased in FIGS. 2 and 3 respectively. These figures show core members for the head guard 4 and the backrest portion 3 respectively, while omitting a cushion member and a cover member. The structure relating to the other head guard 5, which is not shown in FIGS. 2 and 3, is substantially similar to and symmetrical with the structure relating to the head guard 4.

Referring to FIGS. 2 and 3, the core member of the head guard 4 is preferably a resin product. A mounting portion 15 is integrally coupled to the head guard 4 through a hinge portion 14 having a small or reduced thickness. This mounting portion 15 is fixed to a corresponding part of the backrest portion 3 by rivets 16, so that the head guard 4 is held by the backrest portion 3. The hinge portion 14 provides an axis for rotating the head guard 4, so that the head guard 4 is rotatable with respect to the backrest portion 3 about the hinge portion 14. The axis provided by the hinge portion 14 extends substantially in parallel with the direction of upward extension of the backrest portion 3.

The backrest portion 3 is provided with an engaging projection 17 which projects toward the head guard 4. According to this embodiment, the member serving as the core or base for the backrest portion 3 is a resin product, and the engaging projection 17 is integrally formed with this resin product. On the other hand, the head guard 4 is provided with an engaging portion 18 which is engaged with the engaging projection 17. When the head guard 4 is rotated from the position shown in FIG. 2 to that shown in FIG. 3 and vice versa, the engaging portion 18 must pass over the engaging projection 17 with slight elastic deformation. After the engaging portion 18 thus passes over the engaging projection 17, therefore, the positions of the head guard 4 are stably maintained as shown in FIGS. 2 and 3 respectively.

It is possible to rotate the head guards 4 and 5 based on the aforementioned structure by applying slightly strong force to the head guards 4 and 5. According to this embodiment, the head guards 4 and 5 can be rotated in angular ranges of about 15° respectively. Such angular ranges can be arbitrarily set as desired, for example by appropriately configuring and setting the structures described above.

While the hinge portion 14 has been described as a resin part having a reduced thickness employed for rotatably holding each of the head guards 4 and 5 in the aforementioned embodiment, alternatively the hinge 14 may be formed by a pivotal support structure employing a shaft or hinge pin.

While the combination of the engaging projection 17 and the engaging portion 18 is employed in the aforementioned embodiment for fixing each of the head guards 4 and 5 at a desired angle, the same may be replaced by another means. For example, locking means may be employed for strictly fixing the head guards 4 and 5 after rotation by prescribed operations.

While the angle of each of the head guards 4 and 5 is adjustable in two stages in the aforementioned embodiment, the angle may alternatively be changed in three or more stages.

Figure 4:
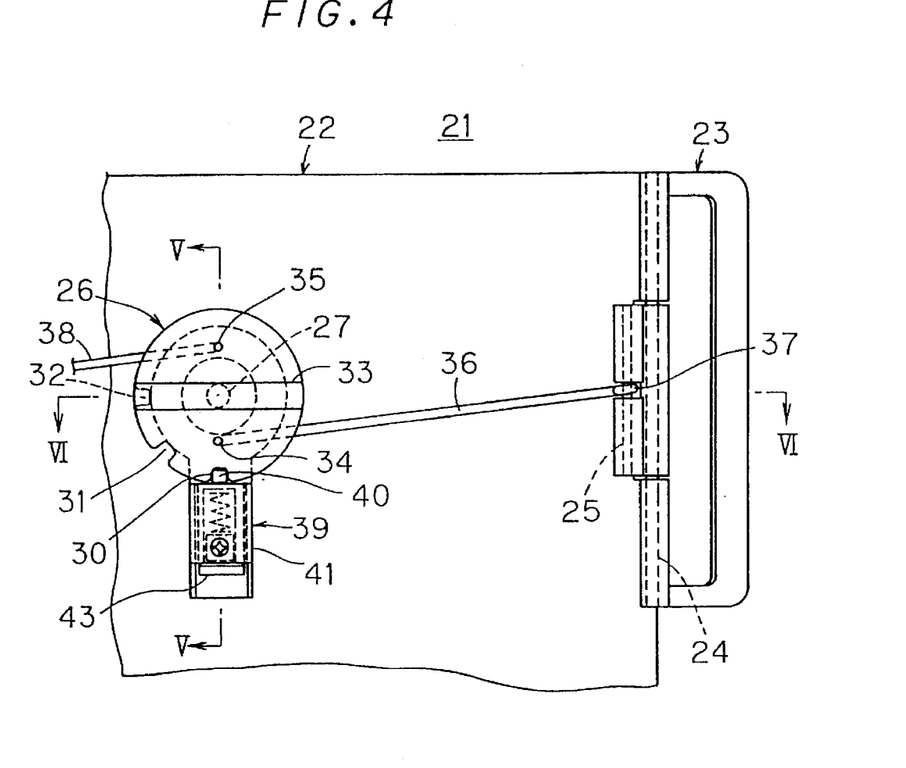
FIG. 4 is a rear elevational view showing a part of a seat included in a child seat apparatus 21 according to another embodiment of the present invention.
Figure 5:
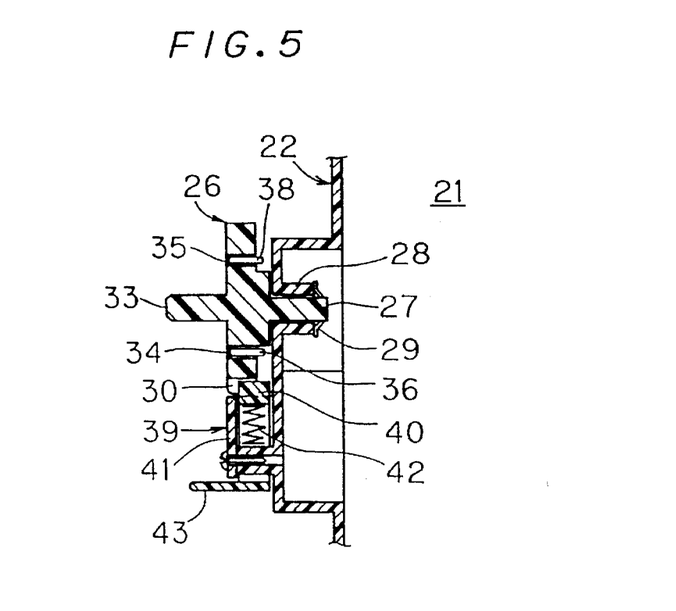
FIG. 5 is a sectional view taken along the line V—V in FIG. 4.
Figure 6:
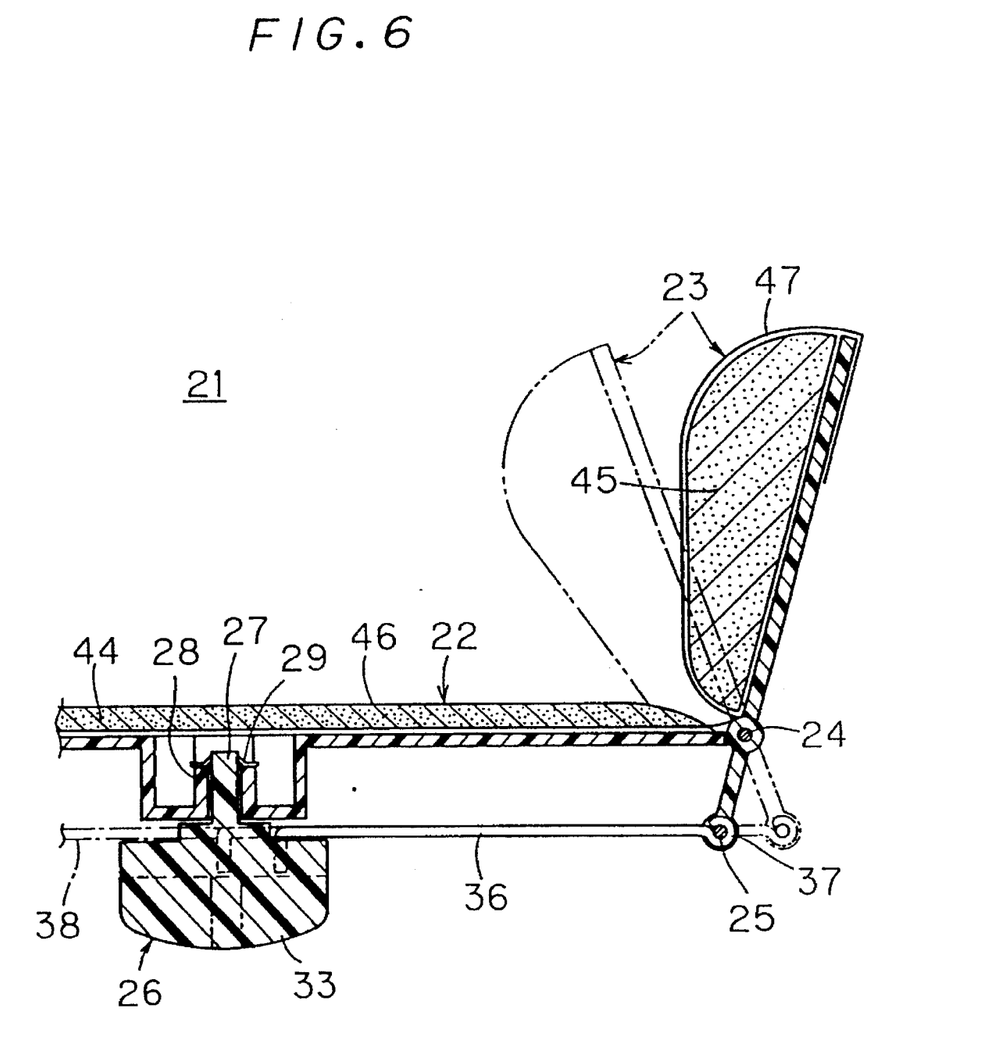
FIG. 6 is a sectional view taken along the line VI—VI in FIG. 4.

FIGS. 4 to 6 show a child seat apparatus 21 according to another embodiment of the present invention. The child seat apparatus 21 shown in these figures is intended to provide a baby carriage or a child chair, for example. FIGS. 4 to 6 show only a part of a backrest portion 22 of the child seat apparatus 21 and only one head guard 23. FIG. 4 shows a rear surface of the backrest portion 22, while FIGS. 5 and 6 show sections taken along the lines V—V and VI—VI in FIG. 4 respectively.

The head guard 23 is connected to the backrest portion 22 by a shaft 24 so as to be rotatable about the shaft 24. The head guard 23 has a first part engaging and positioning the shaft 24, and has a second part extending rearward to the rear side of the backrest portion 22 beyond the first part so that a second shaft 25 is mounted on an end of this second part.

A rotation operating member 26 is rotatably mounted on the rear surface of the backrest portion 22. In more concrete terms, the rotation operating member 26 has an axial part 27, which is inserted in a bearing part 28 provided on the backrest portion 22. A collar 29 engages an end of the axial part 27 and bears against the bearing part 28, thereby preventing disengagement of the axial part 27 from the bearing part 28. A plurality of, e.g., three key ways 30, 31 and 32 are provided in a peripheral surface of the rotation operating member 26. The rotation operating member 26 is further provided with an operating rib 33, for facilitating manual grasping and rotation thereof. In addition, the rotation operating member 26 is provided with pivot holes 34 and 35 in two positions, respectively, between which the rotation center of the axial part 27 is located. According to this embodiment, the pivot holes 34 and 35 are located on a single diameter.

An end of a rigid rod 36 is operably coupled to the aforementioned second shaft 25. According to this embodiment, a ring-shaped portion 37 is formed on the end of the rigid rod 36, to receive the shaft 25 therein. Another end of the rigid rod 36 is perpendicularly bent to be received in one pivot hole 34 provided in the rotation operating member 26. Another head guard (not shown) has a structure which is horizontally symmetrical with that of the head guard 23, so that one end of another rigid rod 38 is coupled to this head guard and another end of the rigid rod 38 is received in the other pivot hole 35 of the rotation operating member 26. The other head guard (not shown) is arranged on another hinge axle shaft that is substantially parallel to shaft 24, as understood from FIG. 4.

In such a structure, the rotation operating member 26 is rotated so that its rotation is transmitted to the head guard 23 through the rigid rod 36 to rotate the head guard 23, and further transmitted to the other head guard (not shown) through the rigid rod 38 to rotate the same. FIG. 6 shows rotated states of the head guard 23 in solid and phantom lines respectively. The head guard 23 and the other head guard (not shown) are symmetrically rotated at the same time.

In order to fix respective positions of the head guard 23 and the other head guard which are rotated in the aforementioned manner, an angle fixing mechanism 39 is provided to be engaged with the rotation operating member 26 for fixing a plurality of rotation angles thereof respectively. The angle fixing mechanism 39 comprises a key member 40 which can be engaged in any one of the key ways 30 to 32. The key member 40 is held by a guide 41 to be movable toward and away from the rotation operating member 26. Further, the key member 40 is urged by a spring 42 toward the rotation operating member 26. The key member 40 is provided with an externally projecting operating tongue 43 for manually grasping and operating the key member 40 to be separated from the rotation operating member 26 against the elasticity of the spring 42.

FIGS. 4 and 5 show the key member 40 engaged in the key way 30. This state is stably maintained by the spring 42. When the key member 40 is thus engaged in the key way 30, the head guard 23 and the other head guard are each maintained in the position shown by the solid lines in FIG. 6. In order to change the position of the head guard 23 and the other head guard as shown by the phantom lines in FIG. 6, a downward force is first applied to the operating tongue 43, thereby downwardly displacing the key member 40 against the elasticity of the spring 42. Thus, the key member 40 is disengaged from the key way 30, thereby allowing rotation of the rotation operating member 26. When the rotation operating member 26 is rotated counterclockwise in FIG. 4 by 90° so that the key member 40 is engaged in the key way 32, the head guard 23 is maintained in the position shown by the phantom lines in FIG. 6. When the key member 40 is engaged in the key way 31, on the other hand, the head guard 23 is maintained in an intermediate position between those shown by the solid and phantom lines in FIG. 6.

As clearly understood from FIG. 6, the backrest portion 22 and the head guard 23 are provided with cushion members 44 and 45 respectively, which are covered with cover members 46 and 47 respectively. The cushion member 44 and the cover member 46 are not shown in FIG. 5.

While the pair of head guards are rendered rotatable with respect to the backrest portion so that the spacing distance therebetween is changeable in each of the aforementioned embodiments, respective ones of such head guards may be mounted on the backrest portion to be translatable in the direction of its width, as described below.

Figure 7A:
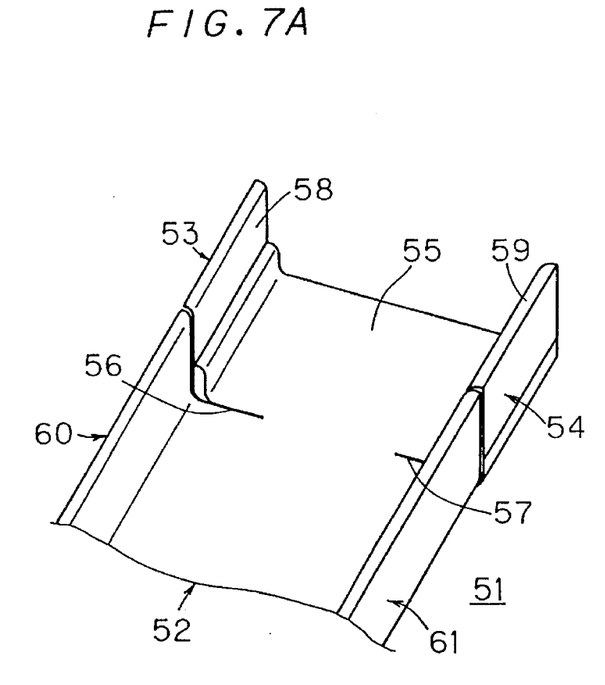
Figure 11:
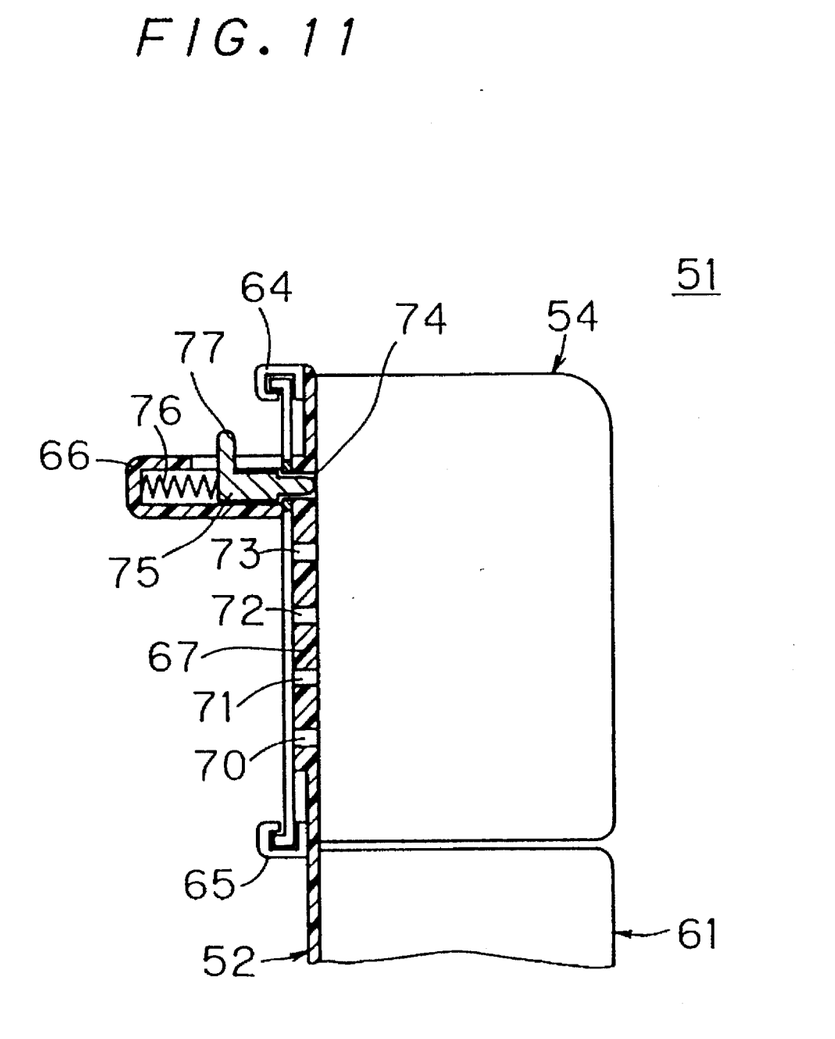
FIG. 11 is a sectional view taken along the line XI—XI in FIG. 9B.

FIGS. 7A to 11 show a child seat apparatus 51 according to still another embodiment of the present invention. This child seat apparatus 51 is intended to provide a baby carriage or a child chair, for example. FIGS. 7A to 11 show only a part of a backrest portion 52 of a seat and a pair of head guards 53 and 54 provided in the child seat apparatus 51. In these figures, FIGS. 7A and 7B are perspective views showing a front surface of the seat and FIGS. 8A and 8B show a front surface of the backrest portion 52, while FIGS. 9A and 9B show a rear surface of the backrest portion 52. FIGS. 10A and 10B are sectional views taken along the lines XA—XA and XB—XB in FIGS. 9A and 9B respectively, while FIG. 11 is a sectional view taken along the line XI—XI in FIG. 9B. FIGS. 7A, 8A, 9A and 10A show the pair of head guards 53 and 54 in positions most separated from each other, while FIGS. 7B, 8B, 9B and 10B show the pair of head guards 53 and 54 in positions closest to each other.

Figure 7B:
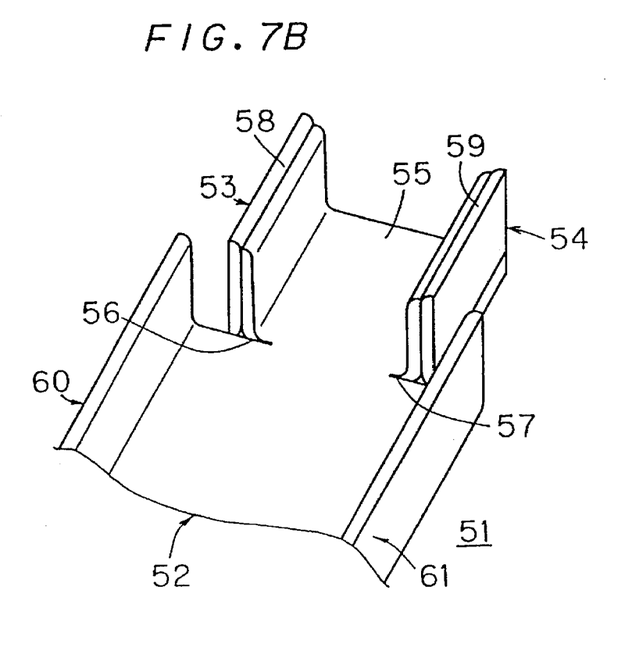
Figure 8A:
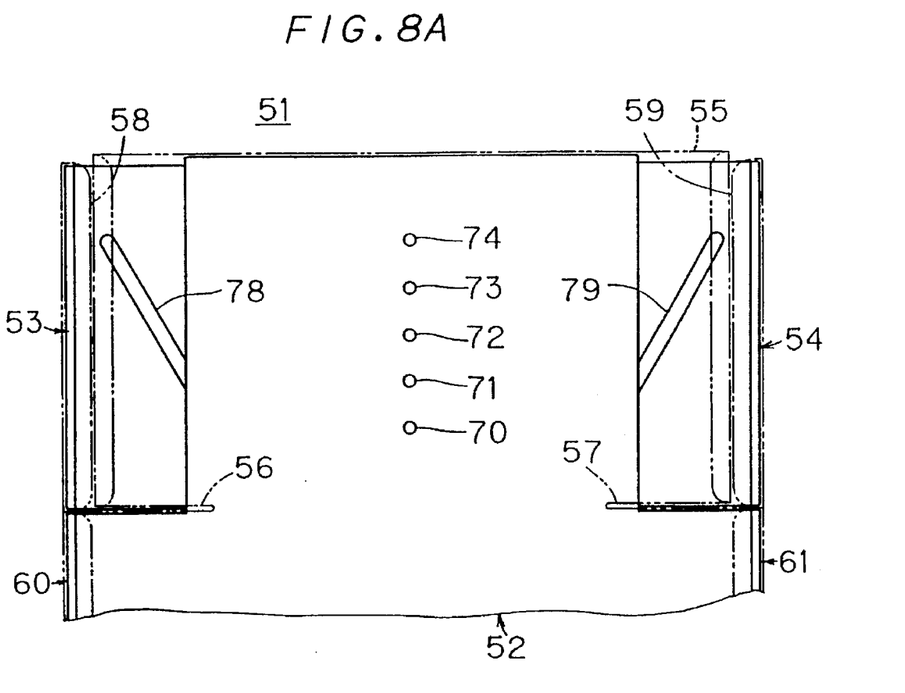
Figure 8B:
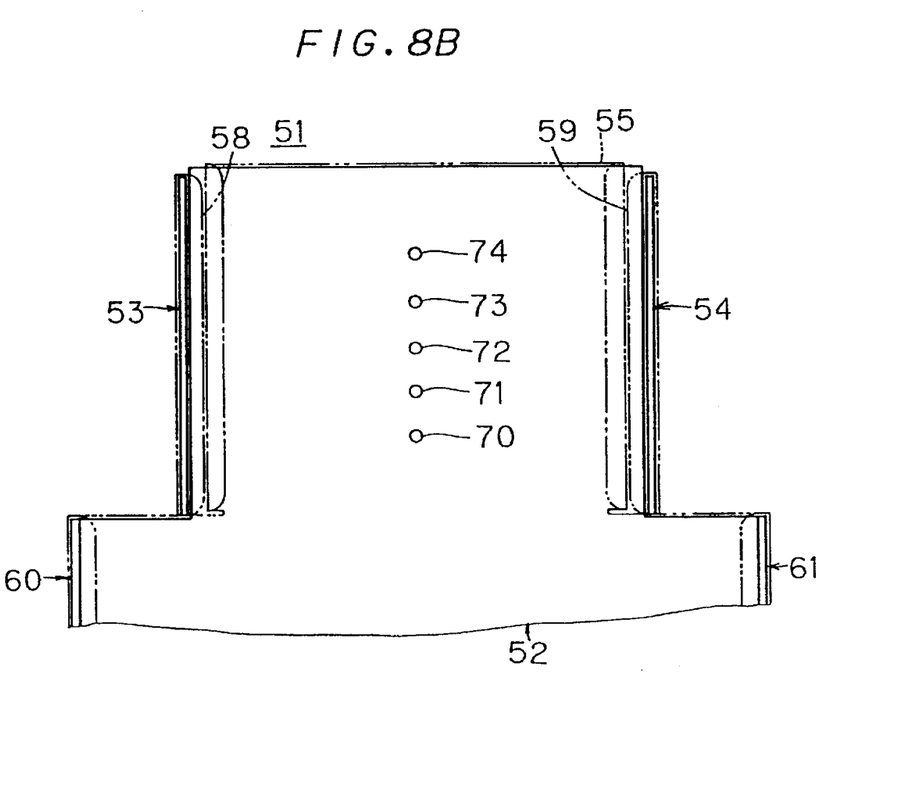
Figure 9A:
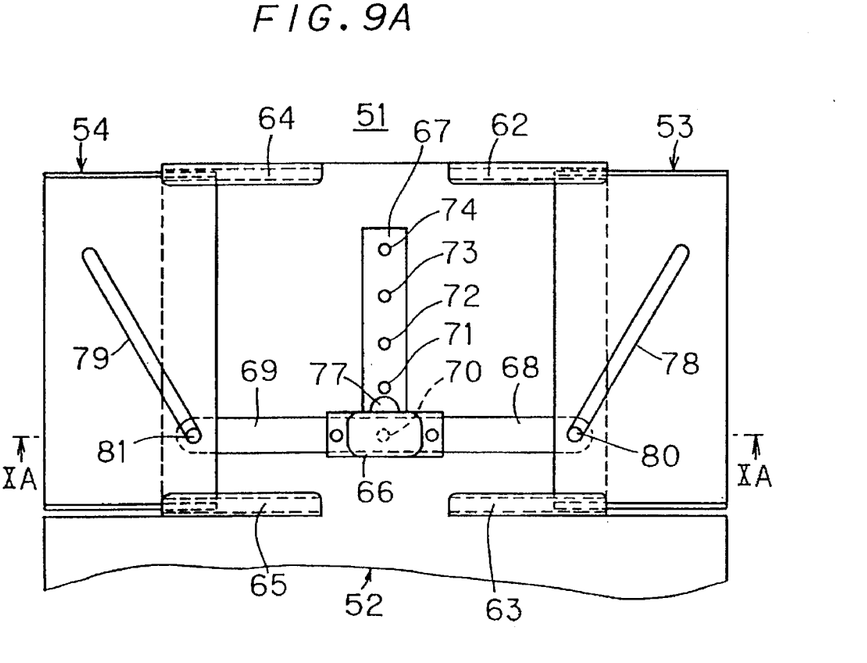
Figure 9B:
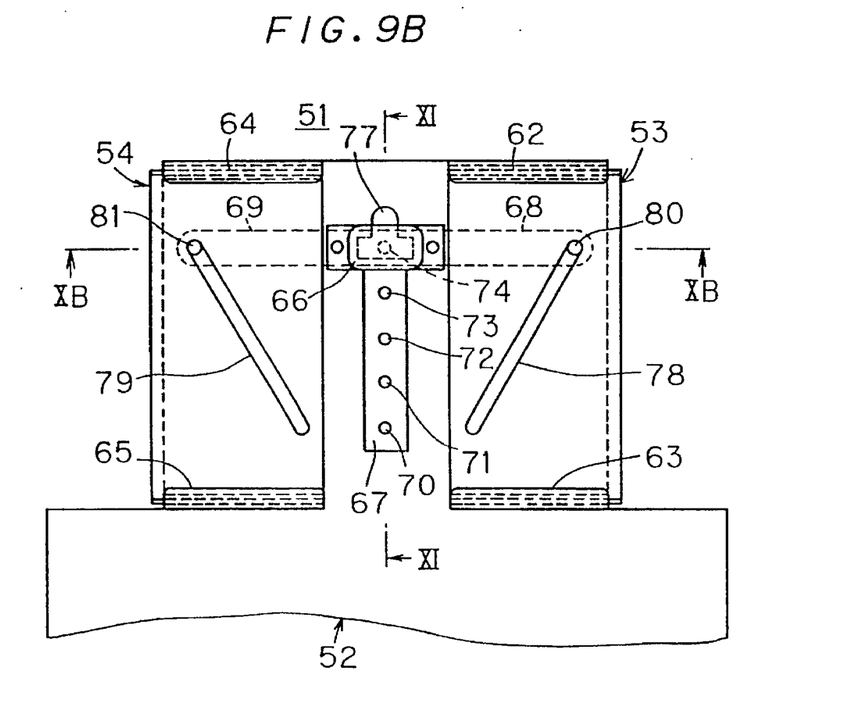
Figure 10A:
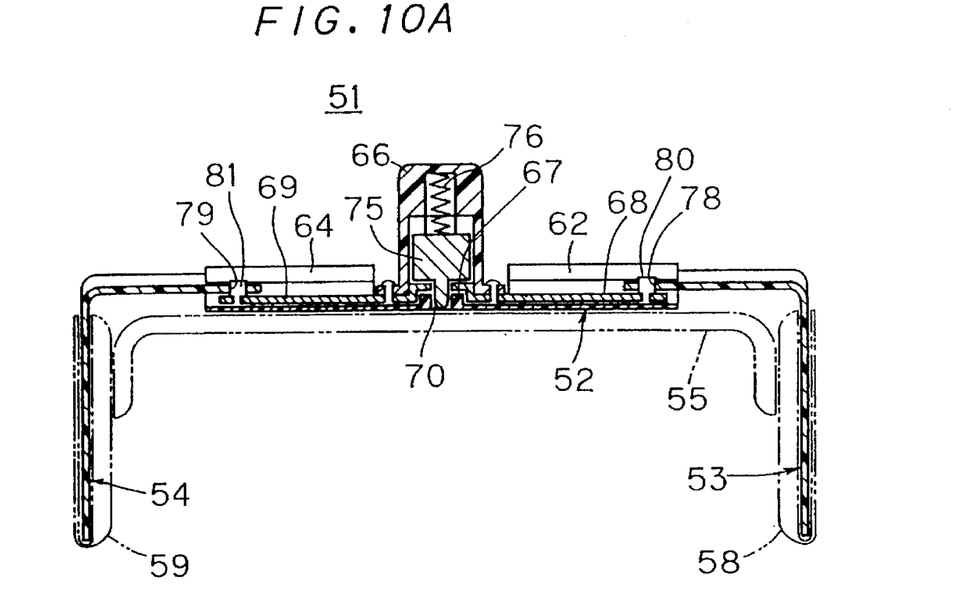
FIGS. 10A and 10B are sectional views taken along the lines XA—XA and XB—XB in FIGS. 9A and 9B respectively.
Figure 10B:
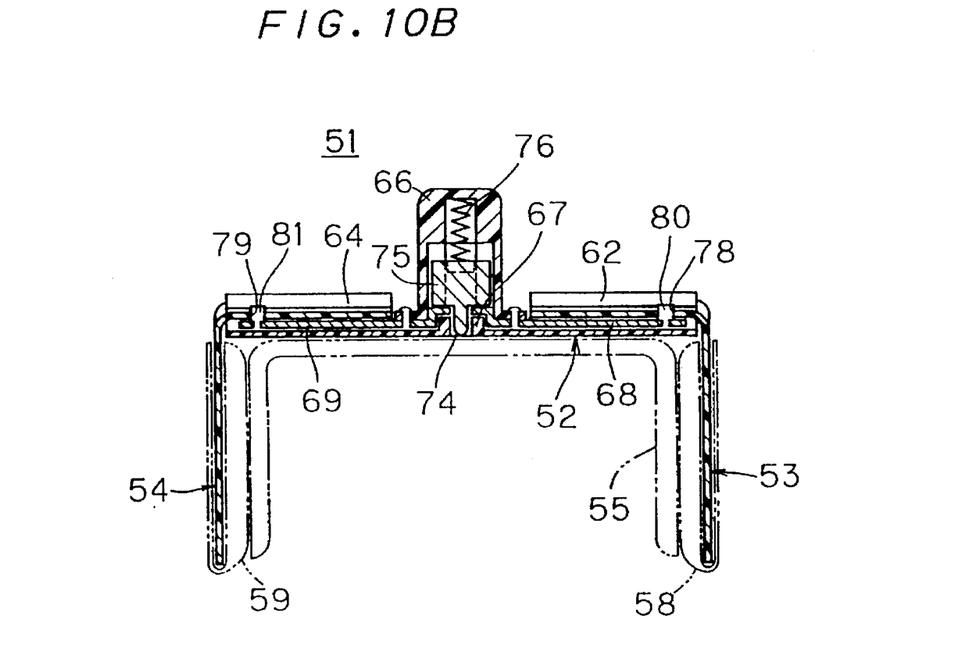

As shown in FIGS. 7A and 7B, a cushion member 55 is arranged on the backrest portion 52 and the head guards 53 and 54. The cushion member 55 is not particularly fixed to the head guards 53 and 54, but is deformed along the head guards 53 and 54 following the movement or repositioning thereof, based on its flexibility. A pair of notches 56 and 57 are formed in the cushion member 55, in order to facilitate such deformation. Additional cushion members 58 and 59 are provided on the head guards 53 and 54 respectively, independently of the cushion member 55. The cushion members 55, 58 and 59 are shown by phantom lines in FIGS. 8A to 10B. These cushion members 55, 58 and 59 are not shown in FIG. 11.

The backrest portion 52 is provided with a pair of side walls 60 and 61 which are aligned with the head guards 53 and 54 when the head guards 53 and 54 are most separated from each other. These side walls 60 and 61 protect a seated child mainly in an area below its shoulders for example the trunk and ribs of the child.

Each of the head guards 53 and 54 has an L-shaped section, and a part thereof is positioned on the rear surface of the backrest portion 52. Guide rails 62 to 65 are provided on the rear surface of the backrest portion 52. The head guard 53 is held by the guide rails 62 and 63, and guided to be movable along the width of the backrest portion 52. On the other hand, the head guard 54 is held by the guide rails 64 and 65, and guided to be movable along the width of the backrest portion 52.

Further, a rectilinear operating member 66 is provided on the rear surface of the backrest portion 52. This rectilinear operating member 66 is movable along a guide rib 67 provided on the rear surface of the backrest portion 52 to extend along the direction of upward extension of the backrest portion 52. Wing members 68 and 69 are mounted on the rectilinear operating member 66 to extend along the width of the backrest portion 52.

As a position fixing mechanism for fixing a plurality of positions of movement of the rectilinear operating member 66, the guide rib 67 is provided with a plurality of, e.g., five engaging holes 70 to 74 distributed along the direction of extension of the guide rib 67. On the other hand, the rectilinear operating member 66 displaceably holds an engaging member 75. Because it is displaceable, the engaging member 75 can be engaged in any one of the engaging holes 70 to 74 and alternatively can be disengaged from the corresponding one of the engaging holes 70 to 74. The engaging member 75 is urged by a spring 76 to be engaged in any one of the engaging holes 70 to 74. The engaging member 75 is provided with a projection 77 projecting toward the exterior of the rectilinear operating member 66. When the engaging member 75 is engaged in any one of the engaging holes 70 to 74, the rectilinear operating member 66 is fixed in its selected position. In order to move the rectilinear operating member 66, the engaging member 75 is first disengaged from the corresponding one of the engaging holes 70 to 74 against the elasticity of the spring 76. The engaging member 75 can be readily moved manually by grasping and moving the projection 77.

The aforementioned wing members 68 and 69 are adapted to implement a transmission mechanism for transmitting the aforementioned rectilinear motion of the rectilinear operating member 66 to the pair of head guards 53 and 54 respectively for simultaneously moving the pair of head guards 53 and 54 toward or away from each other. The wing members 68 and 69 are positioned between the backrest portion 52 and the rear portions of the head guards 53 and 54 respectively. Slots 78 and 79 are provided in the rear portions of the head guards 53 and 54 positioned on the rear side of the backrest portion 52 to extend in directions inclined with respect to the direction of rectilinear movement of the rectilinear operating member 66. The slots 78 and 79 are inclined in directions opposite to each other. On the other hand, guide pins 80 and 81 are mounted on respective ends of the wing members 68 and 69, to be received in the slots 78 and 79 respectively.

FIGS. 7A, 8A, 9A and 10A shows the pair of head guards 53 and 54 in positions most separated from each other. In this state, the rectilinear operating member 66 is located in its lowermost position, so that the engaging member 75 is engaged in the engaging hole 70. Further, the guide pins 80 and 81 are positioned in the lowermost ends of the slots 78 and 79 respectively.

In order to move the pair of head guards 53 and 54 into the position closest toward each other as shown in FIGS. 7B, 8B, 9B and 10B from the aforementioned state, the engaging member 75 is displaced against elasticity of the spring 76 using the projection 77, to be disengaged from the engaging hole 70. Then, the rectilinear operating member 66 is moved upwardly along the guide rib 67, while maintaining the engaging member 75 in a disengaged state. Thus, the guide pins 80 and 81 are moved in the slots 78 and 79 respectively, thereby causing the pair of head guards 53 and 54 to be retracted toward each other. When the projection 77 is released upon final alignment of the engaging member 75 with the engaging hole 74, the engaging member 75 moves into and engages the engaging hole 74 due to the action of the spring 76. In this state, the guide pins 80 and 81 are positioned in uppermost ends of the slots 78 and 79 respectively, to implement and maintain the most retracted or narrowly spaced state of the pair of head guards 53 and 54.

An intermediate state between the aforementioned two typical states can also be implemented by engaging the engaging member 75 in any one of the engaging holes 71 to 73.

According to this embodiment, as hereinabove described, it is possible to transmit the rectilinear operation of the rectilinear operating member 66 to the pair of head guards 53 and 54 respectively, for simultaneously moving the pair of head guards 53 and 54 toward or away from each other.

What is claimed is:

1. A child seat apparatus for seating a child, comprising a seat member, a backrest member comprising a backrest core upwardly extending from a rear end of said seat member and including a lower portion adapted to receive the lower back of the child and an upper portion adapted to receive the head of the child, a pair of head guards forwardly extending from two side edges of said backrest member at said upper portion and not at said lower portion, wherein each of said head guards comprises a respective head guard core, and a pair of hinge members respectively connecting said head guard cores to said backrest core, wherein each of said hinge members is a single integral member including a first flange portion connected to said head guard core, a second flange portion connected to said backrest core, and a hinge joint portion disposed between and continuously flexibly joining said first and second flange portions, wherein said hinge joint portion has a reduced thickness compared to said first and second flange portions, wherein said head guard cores and said hinge members are made of a resin material, wherein said hinge members are respectively integrally formed with said head guard cores, wherein said first flange portions are respectively integral extensions of said head guard cores, and wherein said second flange portions are mounted on said backrest core, and wherein said head guards are rotatable about said hinge joint portions so as to change a spacing distance between said head guards.

2. The child seat apparatus in accordance with claim 1, wherein said hinge joint portions are oriented to define rotation axes extending substantially parallel to a direction of upward extension of said backrest member.

3. The child seat apparatus in accordance with claim 1, further comprising respective first engaging members arranged on said head guard cores, and second engaging members arranged on said backrest core and adapted to respectively engage with said first engaging members when said head guards are rotated into a selected position about said hinge joint portions.

4. The child seat apparatus in accordance with claim 1, further comprising engaging means for maintaining any selected one of a plurality of positions of said head guards obtainable by rotation of said head guards about said hinge joint portions.

5. The child seat apparatus in accordance with claim 4, wherein said engaging means comprise, for each of said head guards, an engaging projection of resin material arranged on said backrest core, and an engaging portion integrally formed on said head guard core and adapted to engage with said engaging projection for maintaining said Selected position of said head guards.

6. A child seat apparatus for seating a child, comprising a seat member, a backrest member comprising a backrest core upwardly extending from a rear end of said seat member and including a lower portion adapted to receive the lower back of the child and an upper portion adapted to receive the head of the child, a pair of head guards forwardly extending from two side edges of said backrest member at said upper portion and not at said lower portion, wherein each of said head guards comprises a respective head guard core, a pair of hinge members respectively connecting said head guard cores to said backrest core, wherein each of said hinge members is a single integral member including a first flange portion connected to said head guard core, a second flange portion connected to said backrest core, and a hinge joint portion disposed between and continuously flexibly joining said first and second flange portions, wherein said hinge joint portion has a reduced thickness compared to said first and second flange portions, wherein said head guards are rotatable about said hinge joint portions so as to change a spacing distance between said head guards, and respective first engaging members arranged on said head guard cores, and second engaging members arranged on said backrest core and adapted to respectively engage with said first engaging members when said head guards are rotated into a selected position about said hinge joint portions.

7. The child seat apparatus in accordance with claim 6, wherein said hinge joint portions are oriented to define rotation axes extending substantially parallel to a direction of upward extension of said backrest member.

8. The child seat apparatus in accordance with claim 6, wherein said first engaging members are integrally formed on said head guard cores and said second engaging members are integrally formed on said backrest core.

9. The child seat apparatus in accordance with claim 6, wherein said hinge members are respectively integrally formed with said head guard cores, wherein said first flange portions are respectively integral extensions of said head guard cores, and wherein said second flange portions are mounted on said backrest core.

10. The child seat apparatus in accordance with claim 9, wherein said head guard cores and said hinge members are made of a resin material.

* * * * *

UNITED STATES PATENT AND TRADEMARK OFFICE
CERTIFICATE OF CORRECTION

PATENT NO.   : 5,645,317

DATED        : July 8, 1997

INVENTOR(S)  : Onishi et al.

It is certified that error appears in the above-identified patent and that said Letters Patent is hereby corrected as shown below:

On the title page:
under "Foreign Patent Documents" please replace
    "17950    of 1895" by --17950    9/1895--;

In the "ABSTRACT", line 8, replace "spaceing" by --spacing--;

Column 2, line 22, after "maintained by" insert --the--;

Column 3, line 57, replace "5 shoulder" by --shoulder--;

Column 7, line 42, replace "moved manually by" by
                    --moved by manually--;

Column 7, line 64, replace "its the" by --its--.

Signed and Sealed this

Seventh Day of October, 1997

Attest:

BRUCE LEHMAN

Attesting Officer          Commissioner of Patents and Trademarks